United States Patent [19]
Johnson et al.

[11] 4,324,216
[45] Apr. 13, 1982

[54] IGNITION CONTROL SYSTEM WITH ELECTRONIC ADVANCE

[75] Inventors: Nicky M. Johnson, Los Altos; Lawrence M. Blaser, Mountain View, both of Calif.

[73] Assignee: Fairchild Camera & Instrument Corp., Mountain View, Calif.

[21] Appl. No.: 110,736

[22] Filed: Jan. 9, 1980

[51] Int. Cl.³ ............................. F02P 5/08; F02P 5/04
[52] U.S. Cl. .................................... 123/415; 123/416; 123/146.5 A; 123/417; 307/110
[58] Field of Search ............... 123/415, 416, 417, 418, 123/479, 480, 609, 651, 146.5 A; 324/391; 307/109, 110, 106

[56] References Cited
U.S. PATENT DOCUMENTS

| 3,106,667 | 10/1963 | Winchel | 307/110 |
| 3,605,713 | 9/1971 | LeMasters et al. | 123/651 |
| 3,681,672 | 8/1972 | Strauss | 307/110 |
| 3,821,635 | 6/1974 | Kimmel et al. | 307/109 |
| 3,881,145 | 4/1975 | Tanigaki | 307/110 |
| 3,882,840 | 5/1975 | Adamian et al. | 123/630 |
| 4,208,992 | 6/1980 | Polo | 123/416 |
| 4,231,332 | 11/1980 | Wrathall | 123/609 |
| 4,239,024 | 12/1980 | Leichle | 123/609 |
| 4,261,312 | 4/1981 | Hart | 123/415 |

Primary Examiner—Raymond A. Nelli
Attorney, Agent, or Firm—Paul J. Winters; Michael J. Pollock; Warren M. Becker

[57] ABSTRACT

An electronic advance and ignition control system incorporating the advance utilizes a fixed advance threshold compared with amplitude of an RPM sensitive input waveform from a distributor in combination with a timing circuit, which establishes a predetermined RPM rate above which the advance operates. The electronic advance accurately duplicates the function of conventional centrifugal and vacuum and advance retard mechanisms in controlling timing of an ignition coil drive signal. The electronic advance is provided as part of an ignition control integrated circuit which can operate in a stand alone mode or share control of the ignition system with a microprocessor through interface circuits also forming part of the integrated circuit.

13 Claims, 11 Drawing Figures $I_c$ & REF. OUT.
AT 100 RPM $I_c$ & REF. OUT.
@ 1K RPM $I_c$ & REF. OUT.
WITH DWELL
THRESHOLD
AT PUMP-DOWN
LIMIT ≈ 2.5K RPM $I_c$ & REF. OUT.
VERY HIGH
RPM (4-5K)

IGNITION CONTROL SYSTEM WITH ELECTRONIC ADVANCE

FIELD OF THE INVENTION

This invention relates to an ignition control system for an internal combustion engine including an electronic advance. More particularly, this invention relates to an electronic advance capable of duplicating electronically the performance characteristics of centrifugal and vacuum advance mechanisms conventionally employed on internal combustion engines, without requiring a vacuum input.

DESCRIPTION OF THE PRIOR ART

Electronic ignition systems are now well known and are replacing conventional or Kettering ignition systems on new internal combustion engines. However, prior art electronic ignition systems in general only serve as replacements for the breaker points and condenser of the older, conventional ignition systems. Other portions of conventional ignition systems, such as the centrifugal advance and the vacuum advance and retard unit continue to be employed with prior art electronic ignition systems. The state of the art in electronic ignition systems is described in, for example, LeMasters et al, U.S. Pat. No. 3,605,713, Adamian et al, U.S. Pat. No. 3,882,840, and in Toboldt and Johnson, *Automotive Encyclopedia* (South Holland, Illinois, Goodhart-Wilcox Company, 1977), pages 394-426.

Such prior art electronic ignition systems have proven to be both highly reliable and effective in operation. In fact, their success has led to the application of electronic techniques to other portions of the ignition system, presently provided by mechanical mechanisms. This has been accelerated by the need for increased fuel economy and anti-pollution requirements, which have led to the use of leaner combustion mixtures than previously employed.

As a result, one of the techniques that has received widespread attention is the utilization of a microprocessor to control ignition drive signals. However, there are certain times, such as cranking the engine for starting, when a microprocessor is unable to provide control due to inherent time delays in initializing the microprocessor at start-up time. Also, various failure modes internal or external to the microprocessor may cause it to be unable to provide control during the running of the engine.

In order to provide information on proper timing and revolutions per minute (RPMs) of an engine having an electronic ignition, pick-up coils are conventionally employed to sense magnetically generated signals. Due to tolerances employed in high volume manufacturing of such sense coils, variations of as much as 30% occur in the maximum output voltages of such sensing coils, i.e., from a minimum of about eight volts to a maximum of about twelve volts at 1,000 engine RPMs. Such variations have prevented the use of an electronic advance in prior art ignition control systems because a corresponding variation in the advance function would be unsuitable for efficient operation of a significant percentage of internal combustion engines incorporating such sense coils.

SUMMARY OF THE INVENTION

Accordingly, it is an object of this invention to provide an electronic ignition control system which can accurately produce output drive signals for an ignition coil that duplicate the effect conventionally produced by a centrifugal advance and/or vacuum advance system, without requiring a vacuum input.

It is another object of the invention to provide a means for generating synchronizing information for a microprocessor controlled ignition system having a fail safe mode in which the ignition system generates drive signals suitable for proper operation of an engine when the microprocessor is not able to control their generation.

It is still another object of the invention to provide an interface among a sensing means responsive to rotation of an automobile distributor, a microprocessor, and an ignition coil drive circuit which allows sharing of control over generation of drive signals for the ignition coil between the microprocessor and the interface, depending on engine and microprocessor operating conditions.

It is a still further object of the invention to provide an electronic ignition control system in which ignition coil drive signals are accurately produced under control of a microprocessor and a separate electronic system accurately controls production of the drive signals during engine cranking or other nonfunctioning of the microprocessor control.

It is yet another object of the invention to provide an electronic ignition control system which has reduced sensitivity to variation in output characteristics of sensing means used to produce timing signals for the system.

The above and related objects may be attained through use of the interface and ignition control system herein disclosed. The interface and ignition control system of this invention is adapted to be connected between a sensing means responsive to rotation of an engine part, such as a distributor, for producing a timing signal having an amplitude which varies with the rotation rate of the engine part and an output drive circuit connected to an ignition coil. The output drive circuit produces a drive pulse in the coil in response to the timing signal. The interface and ignition control system have a means for comparing the amplitude of the timing signal with a predetermined advance threshold amplitude. A means responsive to the comparing means terminates the drive pulse when the amplitude of the timing signal has a predetermined relationship to the threshold amplitude, such as exceeding it. A means responsive to duration of the timing signal inhibits the drive pulse terminating means when the duration of the timing signal exceeds a predetermined time period. The inhibiting means thus inhibits early termination of the drive pulse (i.e., advance) when the engine RPMs are below a predetermined rate. The inhibiting means desirably incorporates a resistance and capacitance (RC) network with a time constant which is used for comparison with the timing signal duration, and hence, RPM rate of the engine. By employing a combination of an amplitude comparison and a time comparison, the advance function in an ignition control system can be provided electronically, can duplicate closely the results obtained with the conventional centrifugal and vacuum advance mechanisms without a vacuum input, and is relatively insensitive to variations in maximum signal amplitude resulting from different pick-up coils.

The attainment of the foregoing and related objects, advantages and features of the invention should be more readily apparent after review of the following more detailed description of the invention, taken together with the drawings, in which:

DESCRIPTION OF THE PREFERRED EMBODIMENT

Figure 1:
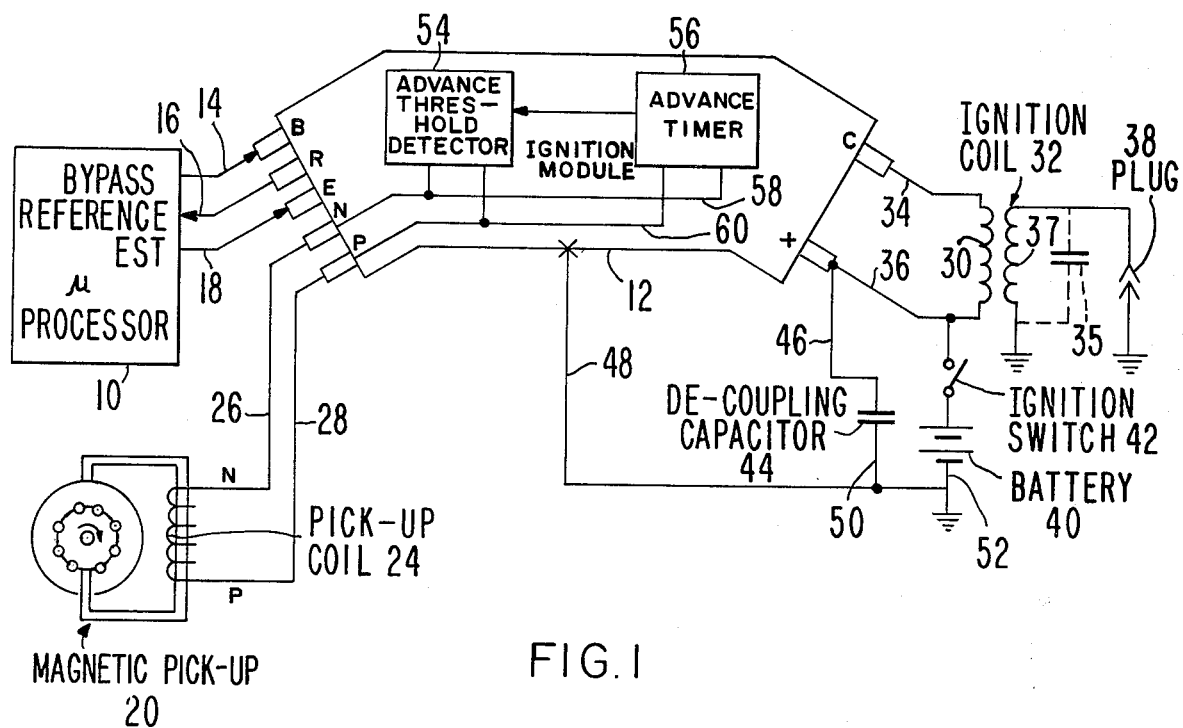
FIG. 1 is a diagram, partially in block form and partially in schematic form, showing basic elements of an embodiment of the invention.

In the drawings and following description, C, D, Q, or R as the first letter of a reference symbol indicates that the referenced item is a capacitor (including a transistor connected as a capacitor), a diode, a transistor, or a resistor, respectively. Z as the first letter similarly indicates a Zener diode (including a transistor connected as a Zener diode). CU as the first letters indicates a (cross-under) resistor. The numbers next to the various resistors and capacitors in FIGS. 9, 10A, and 10B indicate their preferred values in ohms and microfarads, respectively.

Turning now to the drawings, more particularly to FIG. 1, there is shown an ignition control system in accordance with the invention. The system includes an electronic spark timing (EST) computer or microprocessor 10 connected to an interface module 12 by means of lines 14, 16 and 18. The system of this invention can operate with essentially any microprocessor, such as a 6800 manufactured by Fairchild Camera and Instrument Corporation or Motorola, Inc., or an 8080 type microprocesor made by Intel Corporation. A distributor magnetic pick-up 20 includes a conventional polarized magnetic armature and a flux sensing coil 24 connected to interface module 12 by lines 26 and 28. The pick-up coil 24 provides an input signal, shown as 64 in FIG. 2, to the interface module 12. The module 12 and microprocessor 10 utilize this information to provide an output drive signal, shown at 62 in FIGS. 3-6, to primary winding 30 of ignition coil 32 on lines 34 and 36. The ignition coil 32 is designed to provide minimum capacity load, indicated by parasitic wiring capacitance 35, on secondary coil 37. A potential induced in secondary coil 37 by the output drive signal 62 through primary coil 30 produces the desired ignition spark at plug 38. Battery 40, ignition switch 42 and decoupling capacitor 44, connected to module 12 by lines 36, 46, 48, 50 and 52 provide power to the module 12 simultaneous with the ignition coil 32.

The ignition interface module 12 controls the flow of current through ignition coil primary 30 in response to inputs from the microprocessor 10 if the system is operating in the EST mode, or directly from the pick-up coil 24 during cranking and other times when the system is operating in STAND-BY mode under control of the module 12. The module 12 incorporates an advance threshold detector 54, essentially a comparator, connected to coil 24 by means of lines 26 and 28, and an advance timer 56, connected to the pick-up coil 24 by lines 26, 28, 58 and 60. The advance threshold detector 54 terminates the coil current Ic through primary 30, shown as waveform 62 in FIGS. 3-6 when the positive going portion of input timing signal 64, shown in FIG. 2, exceeds a predetermined advance threshold voltage 66, also shown in FIG. 2. Advance timer 56 incorporates an RC network for measuring a minimum RPM, desirably set at 900, below which termination of the coil charging current 62 by operation of threshold detector 54 is inhibited. Operation in this manner controls the advance function as shown in more detail in FIGS. 7 and 8 and explained below.

Operation of the sytem will now be explained in more detail with reference to the waveforms of FIGS. 2-6. In the EST mode of operation, the sytem is controlled by microprocessor 10. Rotation of the distributor shaft either by the natural running of the engine or while cranking induces voltage 64 shown in FIG. 2 across the pick-up terminals P and N of pick-up coil 24. This voltage 64 is proportional to the time rate of change of flux in the magnetic circuit. Thus, Voltage timing signal 64 changes rapidly from a positive to a negative value when the flux goes through a maximum as pole pieces in the distributor are aligned.

Figure 2:
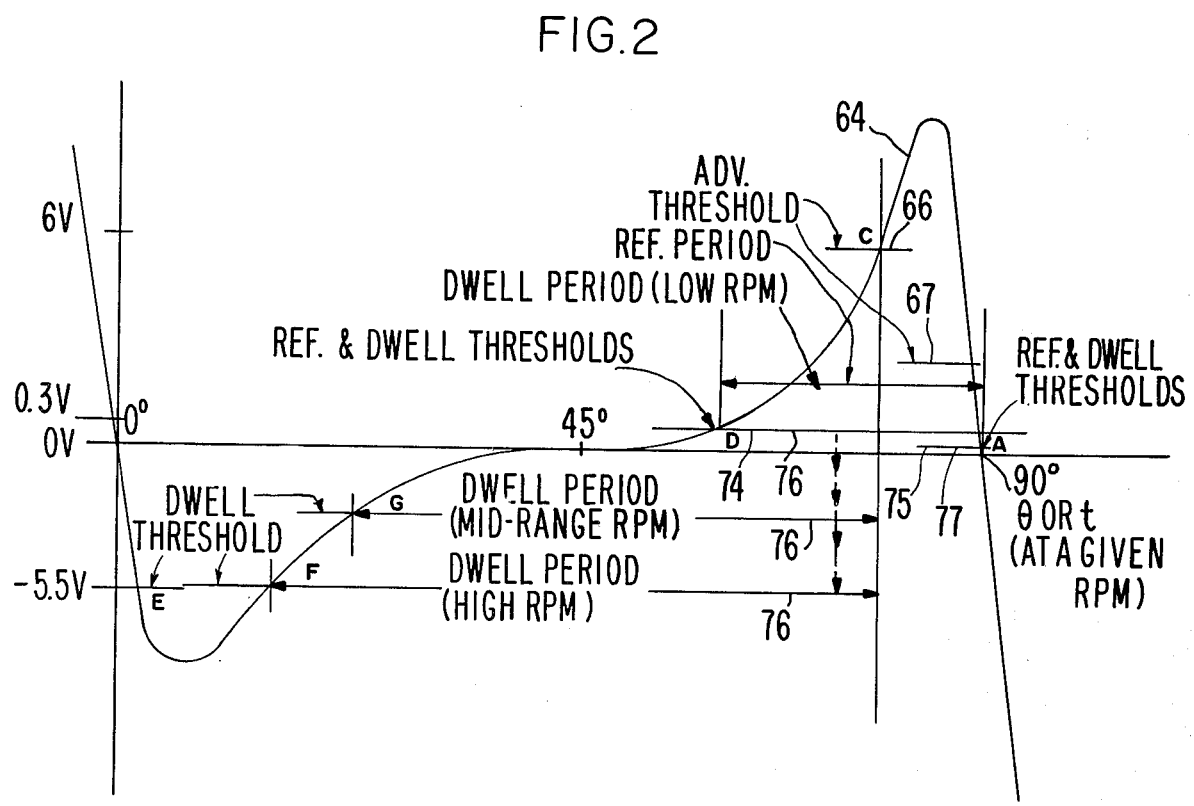
FIG. 2 shows an input waveform used in the system shown in FIG. 1.

The waveform 64 in FIG. 2 represents the pick-up voltage as a function of engine position $\theta$. Variation of engine position $\theta$ from 0° to 90° defines one repetition period of waveform 64. As rotation is assumed, the plot also represents the waveform as a function of time t for a given rotation rate. Since the amplitude of the voltage waveform 64 is proportional to the time rate of change of flux, the amplitude is a function of engine speed, growing larger as speed increases, best shown in FIG. 7 to be discussed below. It should be noted that, if the engine is stationary, there is no voltage developed at the pick-up coil terminals P and N.

Figure 3:
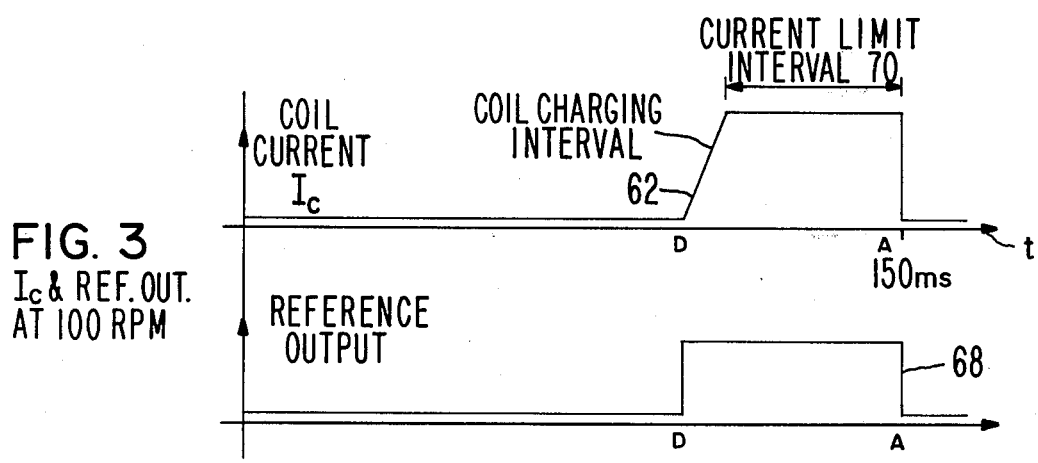
FIGS. 3-6 show output and reference waveforms obtained with the system of FIG. 1 by extracting information from the input waveform of FIG. 2.

Module 12 senses the pick-up waveform 64 and generates a logic signal 68 (FIGS. 3-6) having a true to false (positive to ground) transition which is time synchronized with the positive to negative zero crossing of the pick-up waveform 64, occurring at $\theta$ equals 0° and 90° in FIG. 2. This logic signal 68 is sent to the microprocessor 10 by module 12 on line 16 as the indicator of engine position. The microprocessor 10 senses various conditions in the engine, such as vacuum, RPM, temperature, and the like, and generates an EST logic signal, which is sent to module 12 on line 18, to control the ignition coil current 62 (FIG. 3). In this mode of operation, the microprocessor also holds a BYPASS logic signal on line 14 to module 12 true or positive to indicate to the module 12 that it is to use the EST logic signal on line 18 to control the ignition coil current 62.

During cranking and under failure conditions in the microprocessor 10 or stand alone operation of module 12, the bypass logic signal on line 14 is held false or grounded by the microprocessor 10, or simply grounded in stand alone operation. Under these conditions the module 2 uses the pick-up waveform 64 internally to control the ignition coil current 62. Also, if bypass line 14 is unplugged, module 12 will control the coil current 62 internally. In the bypass mode of operation, module 12 must provide more than rudimentary turn-on and off of coil current 62 at fixed duty cycles;

and must meet more sophisticated requirements as follows: The module 12 must alter the turn-on point of coil current 62 in time to allow full charging of the primary coil 30 at various RPMs, but not spend an excessive percentage of the period in current limit. Above a certain, tightly specified RPM (900 in the preferred embodiment) the module 12 is required to interrupt the coil current 62 in advance of the fall of the pick-up waveform 64 by a predetermined percentage of the period as a function of RPM.

Turning now to the waveforms of FIGS. 2-6 in more detail, the module 12 makes use of three comparators acting in response to pick-up waveform 64. FIG. 2 and Table I show the threshold signals measured and their functions. Each threshold signal has a "positive-going" value corresponding to operation when pick-up voltage 64 is increasing and a "negative-going" value corresponding to operation when pick-up voltage 64 is decreasing.

TABLE I

| THRESHOLD (Vp-n) | Positive-Going | Negative-Going | FUNCTION |
| --- | --- | --- | --- |
| REFERENCE (bypass mode) | +0.30V D | +0.13V A | Timing Signal to Microprocessor |
| DWELL (low RPM, no pump-down) | +0.30V D | +0.13V A | Coil Current Turn-On (and off under 900 RPM) |
| DWELL (high RPM, full pump-down) | −5.3V F | −5.5V E | Coil Current Turn-On |
| ADVANCE | +6.0V C | +2.3V | Coil Current Turn-Off |
| REFERENCE (EST mode) | +1.4V | +0.15V | Timing Signal To Microprocessor |

In the BYPASS mode, when module 12 is controlling the coil charging current 62, all three comparators are actively in use. Two threshold levels to be compared are fixed, i.e., reference (which differs depending on mode) and advance, and one is variable, i.e., dwell, to allow optimization of current on-time at mid range RPMs.

FIGS. 3-6 illustrate the timing of the coil current waveform 62 in response to the pick-up waveform 64 passing through the various thresholds at various RPM rates of an engine. As, for example, illustrated by FIG. 3, most of the on-time of waveform 62 is spent in current limit at low RPMs. The peak power dissipation of the module output stage in this condition is the supply voltage V+ of battery 40 minus the voltage drop across ignition coil primary 30 times the limit current. At 14.4 V supply and 5.6 amp limit current, this is 67 watts. However, the average dissipation is reduced by the percent duty cycle spent in current limit. The thresholds shown in Table I have been selected so that this duty cycle never exceeds 25% at low RPMs.

Figure 4:
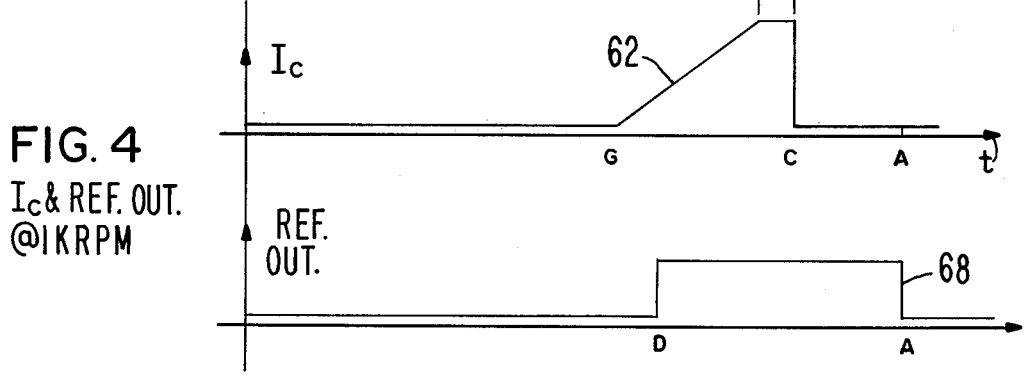

With increased engine speed the "on" time of coil current 62 remains approximately a similar fraction of the repetition period (of waveform 64), but with fewer milliseconds per period and a fixed charge time for the coil 30, the system spends less time in current limit. Further decrease in the time available for current limit begins to occur at 900 RPMs (plus or minus 10%), because at this speed the advance timer 56 has sufficient charge on its RC network remaining to allow initiation of the advance function within the module 12, causing turn-off of coil current 62 at point C in FIG. 4 as opposed to point A on reference waveform 68 and pick-up waveform 64 in FIG. 2. As the current limit interval 70 in FIGS. 3 and 4 is reduced below a predetermined time, module 12 reacts by suppressing (i.e., algebraically reducing) both the positive-going value 76 and the negative-going value 77 of the dwell threshold as shown in FIG. 2. This suppression causes the positive-going dwell threshold 76 to be exceeded at point G on pick-up waveform 64 prior to point D at the initial dwell threshold 76, thus providing additional on-time, as shown by a comparison of waveform 62 in FIG. 3 with waveform 62 in FIG. 4.

Figure 5:
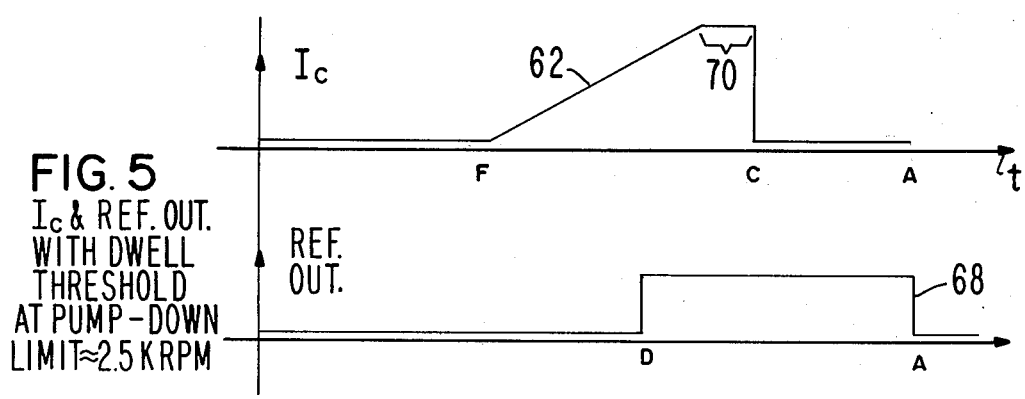
Figure 6:
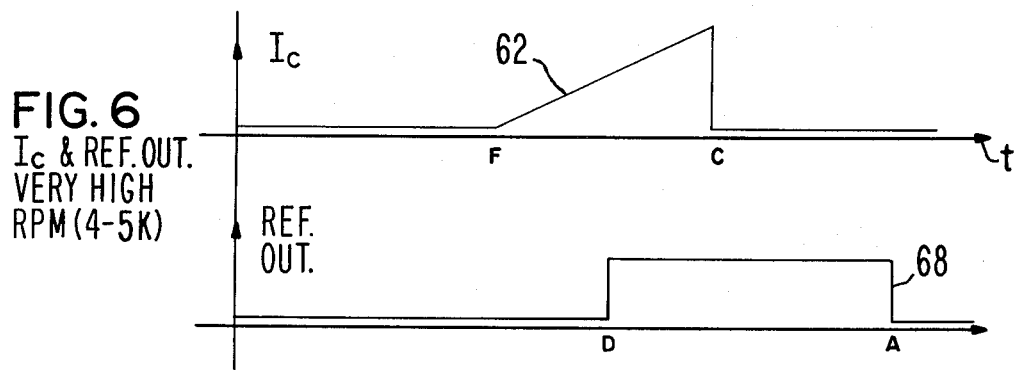
Figure 7:
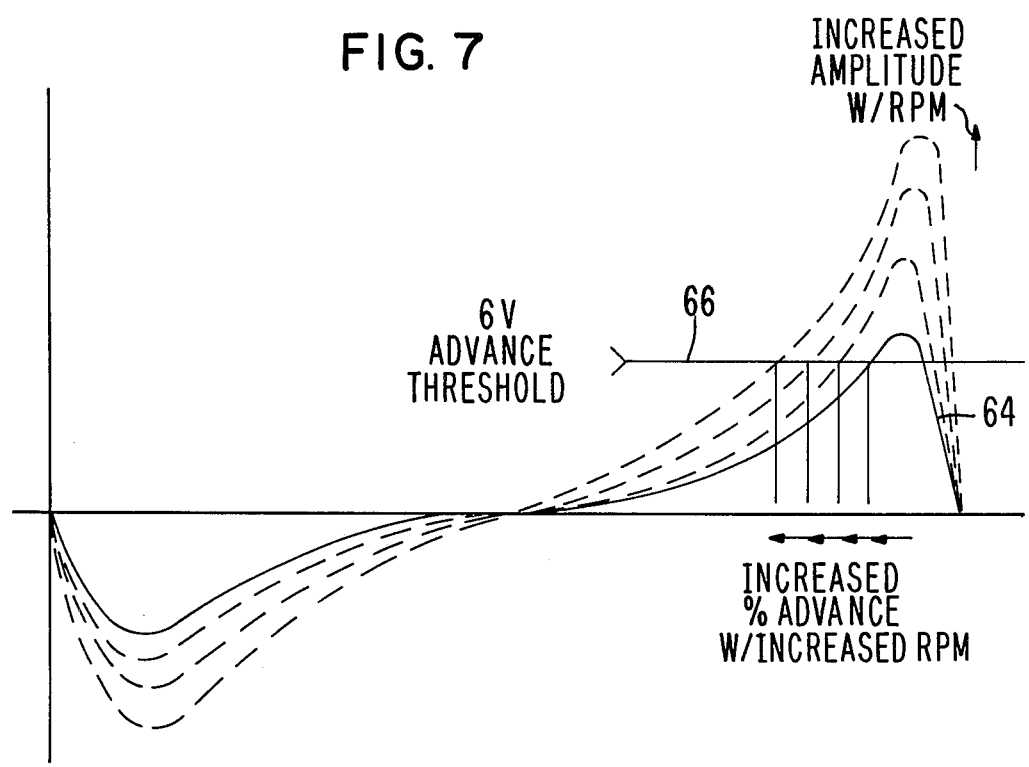
FIGS. 7 and 8 are, respectively, another waveform diagram and a graph of results obtained with the system of FIG. 1.

This so called "pump down" of the dwell threshold 76 or 77 continues as shown in FIG. 2 until the limit of negative dwell threshold excusion is reached as shown at points E and F on pick-up waveform 64 in FIG. 2, and as reflected in coil current waveform 62 in FIG. 5. Further increases in engine RPM progressively absorb the remaining current limit interval 70 and then begin to reduce the coil current 62 at turn-off by moving further back on the positive slope of the current waveform 62, as shown in FIG. 6. The fixed 6 V positive-going advance threshold 66 interacts with the increasing pickup voltage waveform 64 in FIG. 7 with increasing RPM to cause a progressively larger amount of advance, as indicated in FIG. 7 and further shown in the plot of FIG. 8. The fixed reference thresholds 74 and 75 shown in FIG. 2 do not change as a function of RPM. The negative-going reference threshold 75 provides an accurate timing signal to indicate engine position O to the microprocessor 10. The reference thresholds 74 and 75 are selected to be identical to the dwell thresholds 76 and 77 respectively, voltage in the bypass mode at low RPMs, such as during cranking. Unlike the dwell threshold 76 or 77, the reference threshold 74 or 75 does not change with RPM. When the ignition system is operating in the EST mode under control of microprocessor 10, the positive-going reference threshold 74 is set higher at 1.375 V to give additional protection against double pulsing of reference output 16 in FIG. 2 due to ignition pulse induced noise on the P-N output of pick-up coil 24.

The dwell threshold 76 varies between +0.30 V at low RPMs and −5.3 V at high RPMs. Suppression of the dwell threshold 76 in this manner can only occur if the advance threshold 66 is exceeded by the positive portion of the pick-up waveform 64 and the current limit interval 70 is less than about 3 milliseconds. This condition will not begin to occur at less than about 650 RPMs, nor will full suppression of the dwell threshold 76 occur below about 1500 RPMs.

Figure 8:
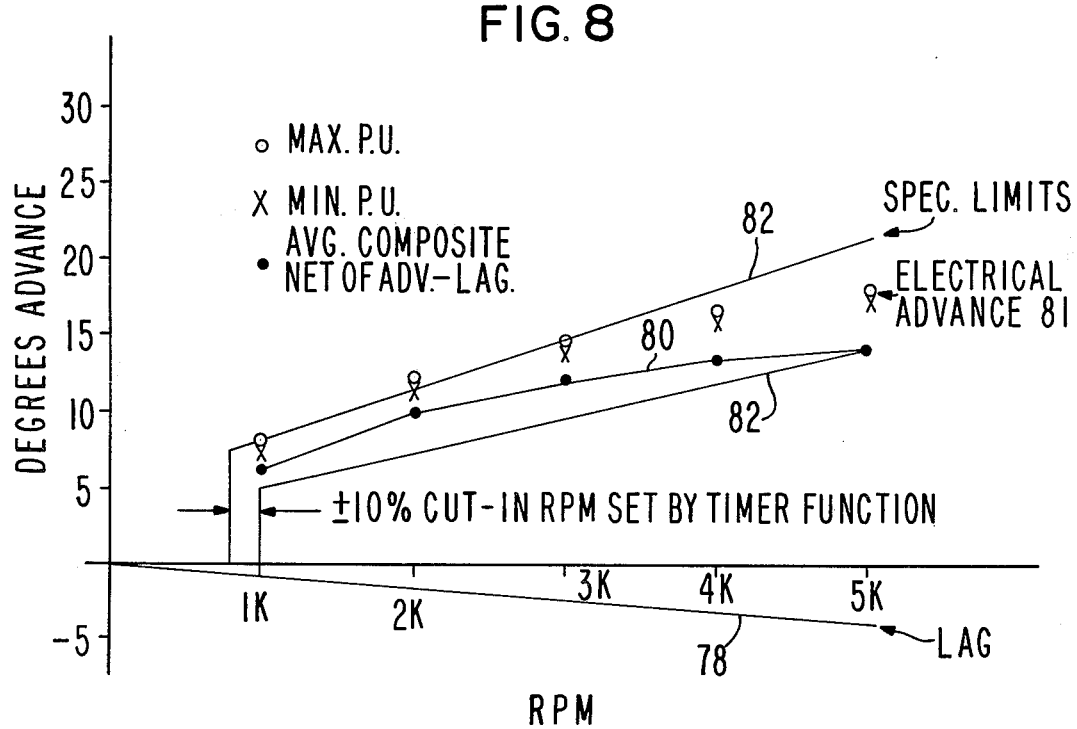

The advance curve obtained through use of the 6 V advance threshold 76 as shown in FIG. 7 with maximum and minimum coil pick-up waveforms 64 is shown in FIG. 8 along with an anticipated linear lag curve 78. The combined average curve of advance and lag is shown at 80 in FIG. 8, along with desired specification limits 82. Table II below summarizes the data and desired specification limits.

TABLE II

| | RPM | ADV° | LAG° | NET° | MIN° | MAX° |
| --- | --- | --- | --- | --- | --- | --- |
| | 1K | 7.1 | −.8 | 6.3 | 5.00 | 8.00 |
| | 2K | 11.25 | −1.5 | 9.75 | 7.25 | 11.25 |
| Min. | 3K | 13.9 | −2.3 | 11.6 | 9.50 | 14.50 |
| pick-up | 4K | 15.8 | −3.0 | 12.8 | 11.75 | 17.75 |
| | 5K | 17.6 | −3.8 | 13.8 | 14.00 | 21.00 |
| | 1K | 8.0 | −.7 | 7.3 | 5.00 | 8.00 |
| | 2K | 12.1 | −1.4 | 10.7 | 7.25 | 11.25 |
| Max. | 3K | 14.4 | −2.2 | 12.2 | 9.50 | 14.50 |

TABLE II-continued

|  | RPM | ADV° | LAG° | NET° | MIN° | MAX° |
|---|---|---|---|---|---|---|
| pick-up | 4K | 16.6 | −2.9 | 13.7 | 11.75 | 17.75 |
|  | 5K | 18.0 | −3.6 | 14.4 | 14.00 | 21.00 |

The lag curve 78 is obtained in the following manner. Module lag is a phenomenon associated with ignition systems using magnetic pick-ups. It comes about because of the output impedance of the sensor (primarily inductive) interacting with the finite (10 K ohms) input impedance of the ignition module to form an R-L single pole network which acts to attenuate high-frequency components of the waveform and introduce phase-shift (delay).

Since the delay of the input waveform 64 is present and more-or-less linear with RPM or frequency any advance or delay characteristic generated electronically within he module is additive to this input effect. Thus, in FIG. 8, curve 78 represents the delay (or lag) due to input effects, item 81 is the result of electronic processing in the module circuit, and curve 80 is the sum of the two effects: the net advance/lag from a mechanical position reference on the distributor.

It should be noted that the combined use of the fixed 6 V advance threshold 66 together with the time constant of the RC network of advance timer 56 gives a much smaller variation in the engine degrees of advance than the 30% or more variation in amplitude of the minimum and maximum coil pick-up waveforms 64. This allows specification limits for advance to be achieved despite the wide variation in pickup coil outputs obtained in practice.

Figure 9:
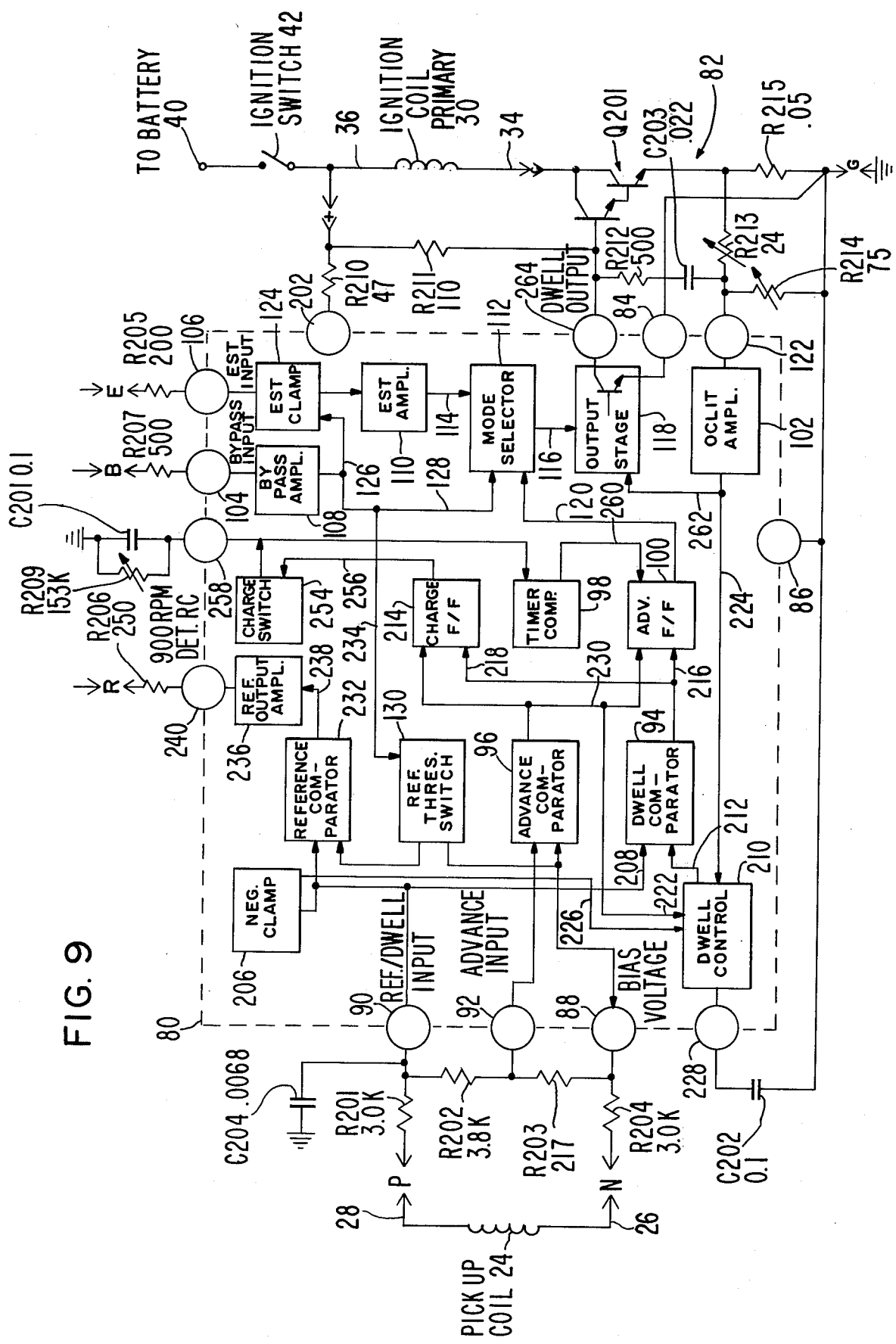
FIG. 9 is a more detailed diagram, partly in block form and partly in schematic form, showing a portion of the system in FIG. 1.

FIG. 9 shows a more detailed block and schematic diagram of module 12. The portion of FIG. 9 enclosed by the dashed line 80 is preferably implemented as a single, bipolar linear integrated circuit (LIC). The output circuit 82 is connected to ignition coil primary 30 by line 34 and includes power Darlington transistor pair Q201, sense resistor R215, active trimmed attenuator R213 and R214, current limit stability network R112 and C203, and resistor R211 drive for Darlington Q201. This circuit is identical to that used in the above-reference Adamian et al patent except that two ground connections are made to the LIC separating the high and low current returns at terminals 84 and 86. This allows elimination of a supply voltage compensation resistor incorporated in the Adamian et al output circuit.

An input attenuator/filter consists of resistors R201, R202, R203, R204 and capacitor C204. A fixed (but dependent on mode) bias voltage is supplied by the LIC 80 to the pick-up coil at terminal 88. Resistor network R201-R204 provides attenuation of the P-N input voltage of waveform 64 by a factor of 2.5 at terminal 90 and a factor of 46 at terminal 92 (assuming high input impedance at these terminals). For equal thresholds at the REFERENCE/DWELL terminal 90 as at the ADVANCE terminal 92, the difference in attenuation provides the specified thresholds 74–77 for the REFERENCE and DWELL functions and the selected thresholds 66 and 67 for the ADVANCE function.

R201-R204 also provide approximately 10 K ohms loading of the pick-up coil 24. C204 in conjunction with R201 and R204 and the output inductance of the pick-up coil 24 provide filtering of both normal and common-mode noise inputs. R201 and R204 also provide current limiting under high voltage conditions at the module input terminals P and N.

Resistors R205, R206 and R207 provide current limiting under transient conditions for the BYPASS and EST inputs and reference output. R205 and R207 form attenuators with pull-down resistors in the LIC 80; therefore they must be accurately trimmed. Dwell control capacitor C202 operates as a capacitive memory which controls turn-on time for coil current 62 based on current limit time of the previous cycle. In effect, capacitor C202 stores the pump-down threshold level 76 or 77 associated with DWELL comparator 94.

The 900 RPM detector RC network R209 and C201 operates as follows: The LIC 80 charges C201 to a precise value just prior to the beginning of each period. Capacitor C201 then is discharged towards ground by R209. The residual voltage is tested by timer comparator 98 at the time the ADVANCE comparator 96 goes high to determine if less than one time constant of R209 and C201 has elapsed, indicating that engine RPM is greater than 900, thus allowing the ADVANCE function to be implemented through ADVANCE FLIP-FLOP 100.

The LIC 80 is a 13 terminal flip-chip bipolar integrated circuit having ion implanted resistors and an area of approximately 11,000 square mils. FIG. 9 also shows the internal block diagram of the LIC 80. Each of the blocks shown is described and analyzed separately below with reference to the circuit schematic of FIGS. 10A and 10B. Note that in both the BYPASS and EST operating modes the REFERENCE OUTPUT signal is delivered to the microprocessor 10 on line 16 (FIG. 1) as an indicator of engine position O and that the OCLIT AMPLIFIER 102 is active in either mode. In the EST mode, the BYPASS and EST signals at terminals 104 and 106 are buffered by their respective input amplifiers 108 and 110 and the resulting logic levels sent to the logic section. In MODE SELECTOR CIRCUIT 112 the EST signal on line 114 is allowed to pass through on line 116 to control the OUTPUT STAGE 118 while the current control signal on line 120 from the ADVANCE F/F 100 is ignored in this mode. The OUTPUT STAGE 118 controls the external Darlington power transistor pair Q201. A current sense signal, at terminal 122 is used by the current limit (OCLIT) amplifier 102 to control the OUTPUT STAGE 118 when the current 62 reaches an external selected level.

In the BYPASS mode, which occurs when the BYPASS input at terminal 104 is either open or grounded, the BYPASS INPUT AMPLIFIER 108 activates the EST CLAMP circuit 124 on line 126, which signals the microprocessor 10 that the module 12 is in BYPASS mode. Bypass Input Amplifier 108 also signals the MODE SELECTOR 112 on line 128 to accept current control inputs from the ADVANCE F/F 100 as opposed to the EST input terminal 106. Also, REFERENCE THRESHOLD SWITCH 130 is set to provide the correct input thresholds 74 and 75 for the BYPASS mode.

When the P-N voltage of waveform 64 (FIGS. 2 and 7) from the pickup coil 24 (via substrate attenuator R201-R204) exceeds the positive going threshold 76 of the DWELL COMPARATOR 94 the ADVANCE F/F 100 is set, which, via the MODE SELECTOR 112, OUTPUT STAGE 118 and power Darlington Q201, turns on the current in ignition coil 30. Subsequently, when and if the P-N input exceeds the ADVANCE threshold, the state of discharge of the 900 RPM DETECTOR RC R209 and C201 is checked by means of the TIMER COMPARATOR 98. If C201 is not discharged below the one time constant level, the ADVANCE F/F 100 is reset, turning off the coil 30 current. If the C201 is adequately discharged, current turn off occurs when the negative going dwell threshold 77 is exceeded at the fall of P-N waveform 64.

Figures 10, 10A:
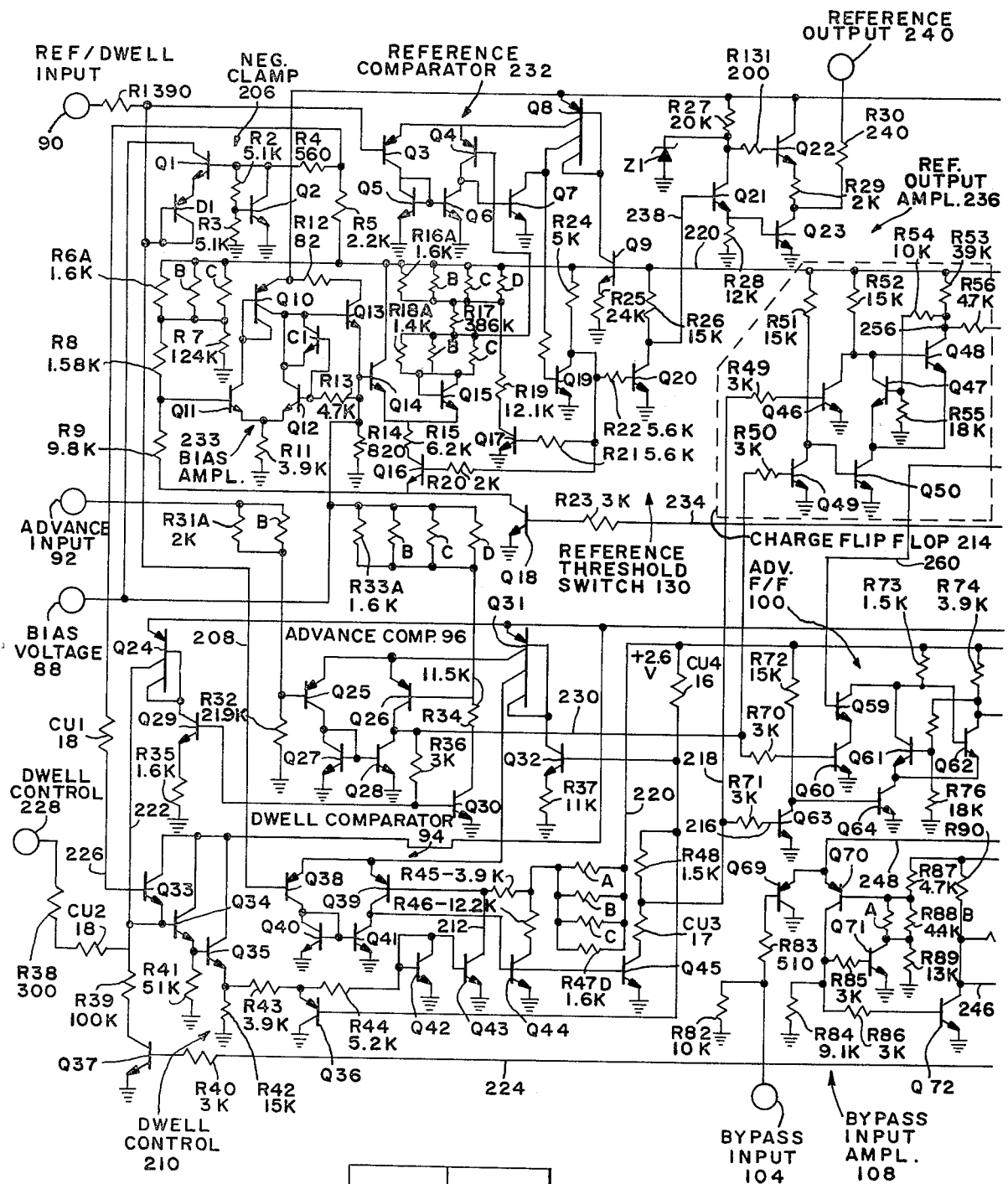
FIG. 10 is a key showing placement of FIGS. 10A and 10B.
FIGS. 10A and 10B are a circuit schematic of the block diagram portions of FIG. 9.
Figure 10B:
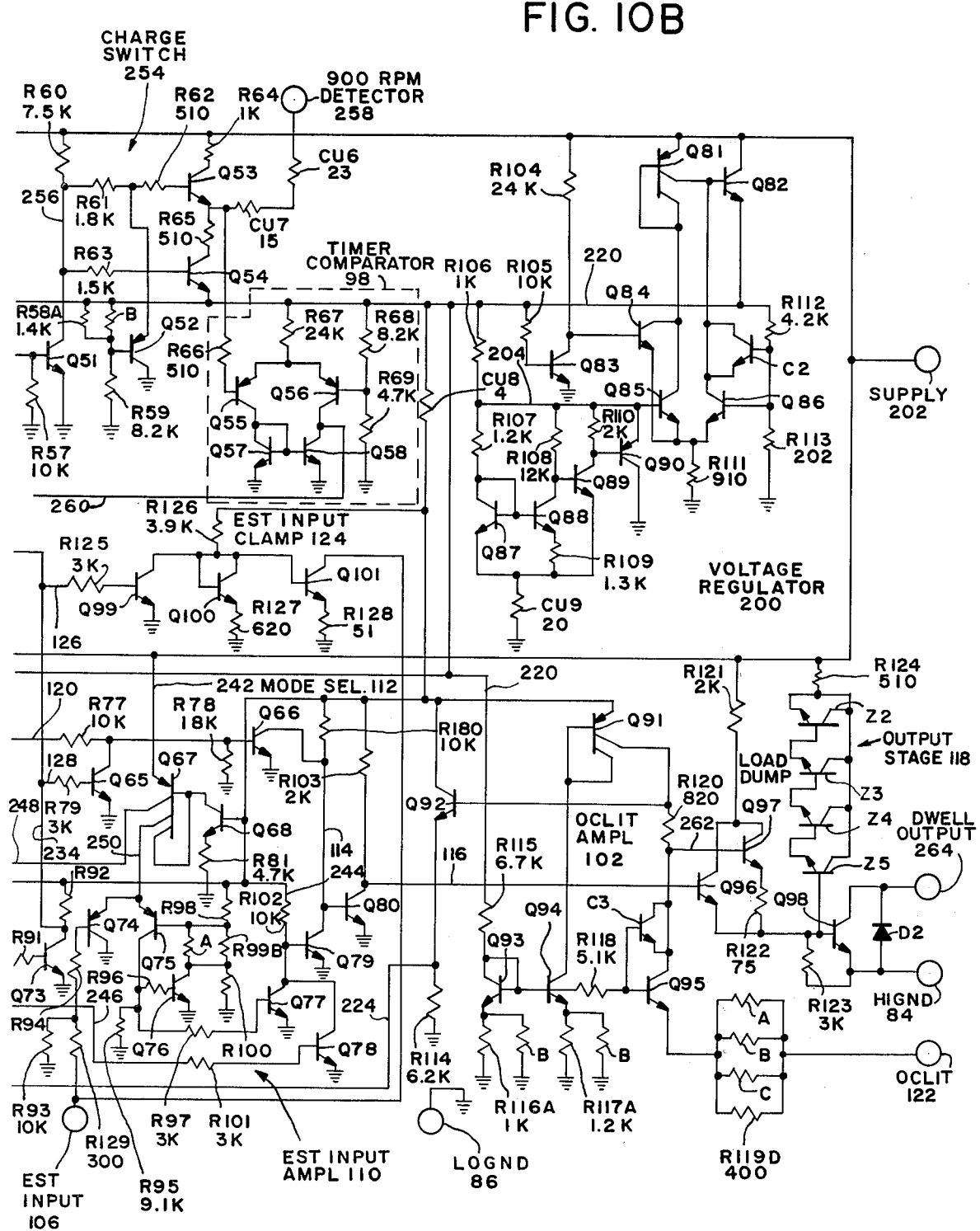

Turning to FIGS. 10A and 10B, voltage regulator 200 receives input supply voltage V+ at terminal 202 and produces a 2.6 Volts regulated output with a slight negative temperature coefficient on line 220. The regulated 2.6 Volts on line 220 is used by nearly all parts of the circuit as both a low voltage supply and as the reference voltage used to generate input thresholds. Q87, Q88, Q89, and Q90 form a bandgap regulator which holds the voltage at line 204 equal to approximately 1.3 Volts as follows: At equilibrium, the voltage at the collectors of Q87 and Q88 is equal to one base-to-emitter Voltage ($V_{BE}$). Because R108 is ten times larger than R107 the current through Q88 is 1/10 that through Q87. The resulting difference in $V_{BE}$ is imposed across R109. To satisfy equilibrium conditions, Q89 adjusts the voltage at line 204 (using emitter follower Q90 to conduct most of the current to a value adequate to supply the required emitter current of Q88 through R108. Q85, Q86, Q81, and Q82 form a conventional differential amplifier biased by R111. Feedback from the output (emitter of Q82) via R112 and R113 to the base of Q86 sets the output voltage at approximately two times the 1.3 volt reference or 2.6 volts. C2 is added for stability; Q83, Q84, R104, R105 are a start-up network.

Dwell comparator 94 (FIG. 10A) receives the REFERENCE/DWELL input from pickup coil 24 via the NEGATIVE CLAMP circuit 206 on line 208 and pump down current from DWELL CONTROL circuit 210 on line 212 for threshold suppression and produces inverted phase output logic signals to ADVANCE F/F 100 and CHARGE F/F 214 on lines 216 and 218, respectively. The function of Dwell Comparator 94 is to sense the pick-up voltage of waveform 64 with respect to precision positive and negative going thresholds 76 and 77.

The regulated 2.6 volt supply on line 220 in conjunction with emitter resistor R37 sets the collector current of Q32 to approximately 173 microamperes. This current is reflected from the positive supply by Q31 connected as a current mirror. The split collector of Q31 supplies 86 microampere bias currents to both the ADVANCE COMPARATOR 96 and the DWELL COMPARATOR 94. Q38, Q39, Q40 and Q41 form a differential amplification stage with active load. The output of the stage at the collectors of Q39 and Q41 feeds the bases of Q44 and Q45 in parallel. Q44 provides positive feedback to the differential stage by means of the divider formed by R46 and R47 (shown as R47A, R47B, R47C, and R47D). This feedback sets the negative going threshold 77 of the stage. Q45 with pull-up resistor R48 provides the output to both the ADVANCE and CHARGE flip-flops 100 and 214. Pump-down current from the DWELL CONTROL circuit 210 flows through resistor R45 lowering both the positive and negative going thresholds 76 and 77.

The dwell control circuit 210 receives a bias from the advance comparator 96 on line 222, which turns on the charging network when the P/N pickup voltage of waveform 64 exceeds +6 Volts, an OCLIT sense signal from OCLIT AMPLIFIER 102 on line 224, which turns on a discharge path when the coil current limit, and a bias from the NEGATIVE CLAMP circuit 206 on line 226 which maintains a minimum charge voltage on the dwell control capacitor C202. Dwell Control Circuit 210 produces an output "pump down" drive on line 212 to the dwell comparator 94 which reduces the threshold levels 76 and 77. The DWELL CONTROL circuit 210 senses the time spent in current limit each period and adjusts the turn-on threshold 76 of the DWELL COMPARATOR 94 to maintain this time at a constant level. Dwell Control circuit 210 is only effective at mid range RPM; at low speeds the DWELL threshold 76 or 77 is fixed at the positive maximum. At high RPM, Dwell threshold 76 or 77 it is fixed at its negative minimum.

At low RPM the ADVANCE COMPARATOR 96 is not activated; the voltage on the DWELL CONTROL capacitor C202 is held at approximately one volt by Q33 and the bias voltage from the NEGATIVE CLAMP circuit 206. As RPM increases the input signal amplitude increases, until at about 400 RPM the ADVANCE threshold 66 is exceeded. This causes charge current (12.6 $\mu$A) to flow into current mirror Q24 and thereby into the external 0.1 microfarad capacitor C202 connected to terminal 228. Up to about 1 K RPM the total "on" time is set by the DWELL COMPARATOR maximum threshold 76 and 77 is adequate to insure that the amount of charge delivered by the ADVANCE comparator 96 is discharged through R39 and Q37 during the current limit interval. As RPM increases above 1 K the percent of period in current limit is reduced and the percent of period exceeding the ADVANCE threshold 66 increases to a point where there is net positive current into the capacitor C202. As the voltage on the capacitor C202 increases it beings to deliver current to mirror transistors Q42 and Q43 via buffer transistors Q34 and Q35 and current seeting resistors R43 and R44. This current is delivered to the DWELL COMPARATOR 94 and results in a suppression of the input thresholds 76 and 77 and, thus, a lengthening of percent of period in current limit until equilibrium is re-attained. The upper limit of current supplied to the DWELL COMPARATOR 94 is set by clamp Q36 acting on the junction of R43 and R44. The percent of period exceeding the ADVANCE threshold 66 varies from a minimum (low output voltage pickup) of about 6% percent at 1 K RPM to a maximum of about 11% at 2 K (high pickup). Above 2 K RPM the DWELL CONTROL circuit 210 is clamped by transistor Q36.

The ADVANCE COMPARATOR 96 receives the attenuated input signal from P/N pickup coil 24 at terminal 92 and produces the charging current to DWELL CONTROL circuit 210 on line 222 and a logic signal to ADVANCE F/F 100 and CHARGE F/F 214 on line 230. The ADVANCE COMPARATOR 96 senses the positive voltage peak of waveform 64 from the P side of the P/N pickup coil 24 and provides a signal which is used to interrupt the ignition coil current in advance of the negative going zero crossing of the pickup coil waveform 64. During the time that the pickup coil voltage is above the present threshold voltage 66, the ADVANCE COMPARATOR 96 also turns on the charge current to the DWELL CONTROL circuit 210. The attenuated signal from the P/N pickup coil network is applied to terminal 92 and level shifted by R31 (shown as R31A and R31B) and R32 before being fed into the base of Q25. Transistors Q25 and Q26 form a differential input pair which feed current mirror load Q27 and Q28. The output from the input stage drives hysteresis switch transistor Q30 and sends the charge current to the DWELL CONTROL circuit 210 by means of Q29 and R35 and drives the ADVANCE F/F 100 and CHARGE F/F 214. The positive-going threshold 66 is set by the divider action through R31 and R32 and externally by resistor attenuator R201, 202, 203 and 204. Hysteresis is set by the resistive divider R33 (shown as R33A, R33B, R33C, and R33D) and R34, which is switched ON and OFF by Q30.

The REFERENCE COMPARATOR 232 receives the attenuation input signal from P/N pickup coil 24 at terminal 90 with respect to the bias voltage at terminal 88. THRESHOLD SWITCH 130 receives the logic signal identifying operation in either EST or BYPASS. mode from BYPASS AMPLIFIER 108 on line 234. Reference Comparator 232 provides an output reference signal to REFERENCE OUTPUT AMPLIFIER 236 on line 238 Reference Threshold Switch 130 provides a bias voltage to the N side of the P/N coil 24 network at terminal 88. The REFERENCE COMPARATOR 232 senses the P/N pickup coil voltage and provides an output through the REFERENCE OUTPUT AMPLIFIER 236 to the EST microprocessor 10 at terminal 240. The REFERENCE THRESHOLD SWITCH 130 changes the required threshold levels 74 and 75 of the comparator 232 depending upon whether the module 12 is in EST or BYPASS mode of operation.

The P/N pickup coil input 64 is fed through terminal 90 into the base of Q3. Transistor Q3 and Q4, which form the differential input to the COMPARATOR 232, feed into current mirror transistors Q5 and Q6. These stages control amplifier Q7, which drives Q19. The output from the collector of Q19 drives the comparator output amplifier Q20 and also Q17 and Q16, which are part of the REFERENCE THRESHOLD SWITCH 130. The current sources for the differential input stage, Q3 and Q4, and for amplifier Q7, are derived from PNP current mirror Q8, which is controlled by the current from Q9. The REFERENCE THRESHOLD SWITCH 130 operates in the BYPASS mode when the logic input from the BYPASS AMPLIFIER 108 to Q18 is low. In this condition, Q18 is OFF and the voltage into the BIAS AMPLIFIER 233 is set by the resistive divider R6 (shown as R6A, R6B, and R6C) and R7, which connects to the regulated +2.6 V supply on line 220. The voltage at the junction of R6 and R7 is coupled through resistor R8 into the input transistor Q11 of the unity gain, BIAS AMPLIFIER 233. The BIAS AMPLIFIER 233 consists of input differential pair Q11 and Q12 coupled to the current mirror load, Q10. The input stage feeds the emitter follower output transistor Q13, which feeds back into Q12 of the differential input stage through resistor R13. Resistor R13 and capacitor C1 stabilize the feedback amplifier at unity, closed-loop gain. The low impedance output of the bias amplifier 233 connects to the low side of the P/N pickup coil network through terminal 88. The voltage at terminal 88 (which is set by the dividers R6 and R7 in BYPASS mode operation) with respect to the regulated +2.6 V supply sets the positive-going threshold 74 of the reference comparator 232. The hysteresis of the reference comparator 232 in BYPASS mode is controlled by the resistive divider R16 (shown as R16A, R16B, R16C, and R16D) and R19 connected between the regulated 2.6 V supply and the switched collector of Q17. The voltage at the junction of R16 and R19 is fed to the base of Q4 of the comparator input stage through R17. The negative-going threshold 75 of the reference comparator 232 is the difference between the voltage at the junction of R6 and R7 and the voltage at the junction of R16 and R19 when Q17 is ON. In EST mode operation, Q18 is turned ON and the thresholds and hysteresis levels in the reference comparator 232 are substantially modified. The positive-going threshold 74 is now determined by the resistive divider network R6, R7, R8 and R9 which supplies a bias voltage from the junction of R8 and R9 into the bias amplifier. The hysteresis voltage in EST mode is determined by the resistive network R16, R17, R18 (shown as R18A, R18B, and R18C) and R19 which is switched ON and OFF by Q16 and Q17. When Q16 is ON, the bias voltage at 88 is precisely transferred to the resistive network by matched transistors Q14 and Q15, which operate at the same collector current. This arrangement allows the negative-going threshold 75 to be set to the high accuracy required for proper operation of the module 12.

The REFERENCE OUTPUT AMPLIFIER 236 receives the output of the reference comparator 232 and drives the microprocessor 10 by providing the reference output signal with suitable voltage and impedance levels for driving the input stage of the EST microprocessor 10. When Q20 of the reference comparator 232 turns OFF, Q21 and Q23 are driven into saturation and Q22 is OFF. The output voltage in the low state is the saturation voltage of Q23 and the output resistance is the sum of the saturation resitance of Q23, the current limit resistor R30, and the series protection resistor, R206. When Q20 turns ON, Q21 and Q23 are turned OFF. The collector of Q21 is clamped at +6 V by Zener diode Z1. The output voltage in the high state is set by the 6 volts of Zener diode Z1 less the VBE of Q22. The output resistance is the sum of R29, R30 and resistor R206.

The NEGATIVE CLAMP 206 receives the regulated +2.6 V supply on line 220 as an input and provides outputs at terminal 88 to N side of P/N pickup coil network, at terminal 90 to P side of P/N pickup coil network, and a (1.64-volt) bias voltage on line 208 to DWELL COMPARATOR 94. The NEGATIVE CLAMP 206 limits the negative excursion of the voltage at the reference and dwell comparator inputs to approximately ground potential. The clamp 206 prevents conduction of isolation diodes and possible activation of parasitic circuit elements which could disrupt normal circuit operation. A voltge equal to 2 $V_{BE}$ is set up by the $V_{BE}$ multiplier consisting of R2, R3 and Q2. Current from the regulated +2.6 V supply on line 220 is supplied through resistors R4 and R5. (The voltage at the junction of R4 and R5 is used in the dwell control circuit 210 to hold a minimum charge voltage on the dwell capacitor C202). Tranistor Q1 is a buffer for the clamp current which flows from terminal 88, into the collector of Q1, through the emitter of Q1, through D1 back into the P/N pickup coil network through terminal 90. The hig voltage diode D1 is in series with Q1 to block the high positive voltage which appears at terminal 90. The absolute value and temperature coefficient of the $V_{BE}$ of Q1 and the forward diode drop of D1 are approximately compensated by the 2 $V_{BE}$ of multiplier Q2. The resulting clamp voltage and clamp voltage temperature coefficient (TC) is therefore about zero. The most critical operating point for the clamp 206 is the lowest RPM for full pump-down ($\approx$1.5 K RPM) The clamp voltage must be less than the minimum DWELL comparator threshold 76 or 77 (+0.4 volts).

The BYPASS INPUT AMPLIFIER 108 (shown partly in FIG. 10A and partly in FIG. 10B) receives the BYPASS signal from microprocessor 10 via a 500 ohm series thick film resistor R207 at terminal 104, and the V+ and 2.6 V supply on lines 242 and 244, respectively. Bypass Input Amplifier 108 produces in-phase logic signals (BYPASS HIGH and Q73 COLLECTOR HIGH) to MODE SELECTOR SWITCH 112 on line 128 and REFERENCE THRESHOLD SWITCH 130 on line 234 and an inverted phase logic signal on line 246 to the EST AMPLIFIER blanking switch Q78 of MODE SELECTOR 112. The BYPASS INPUT AMPLIFIER 108 terminates the BYPASS input with 10 K ohm pull-down resistor R82 and accurately senses the state 8 the BYPASS input by means of positive-going and negative-going-thresholds. The BYPASS input signal at terminal 104 is terminated and pulled down under open line conditions by R82. R83 serves to limit current during possible transient excursions of the input. Differential amplifier pair Q69 and Q70 are fed 0.2 mA bias current from one collector of Q67 on line 248. This current is generated by Q67 acting as current mirror from the positive supply voltage for the collector current of Q68. The regulated 2.6 volts at the base of Q68 in conjunction with emitter resistor R81 sets the collector current of Q68 at approximately 0.4 mA. Geometry provisions in Q67 divide this current equally to bias both the BYPASS INPUT AMPLIFIER 108 and the EST INPUT AMPLIFIER 110. The voltage at the base of Q70 sets the positive and negative going thresholds for the BYPASS INPUT AMPLIFIER 108. Positive feedback from the collector of Q70 via Q71 modifies the resistive divider formed by R87, R88 (shown as R88A and R88B) and R89 yielding two state values for the voltage at the base of Q70: 2.04 V and 0.96 V. A separate parallel output path from the collector of Q70 is formed by saturated switching amplifier R86, Q72 and R90. The output of this stage is inverted in sense with respect to the BYPASS input; and is used by the EST INPUT AMPLIFIER 110 to blank its output in the BYPASS mode. This output is inverted in R91, Q73 and R92 to provide an in-phase (or same sense) output with respect to the BYPASS input for use by the MODE SELECTOR 112 to blank the output of the ADVANCE FLIP-FLOP 100 in the EST mode. This output is also used to control the REFERENCE THRESHOLD SWITCH 130 which varies the threshold of the REFERENCE COMPARATOR 232 as a function of mode.

The EST INPUT AMPLIFIER 110 (FIG. 10B) receives the EST signal from microprocessor 10 at terminal 106 and a bias current from the BYPASS INPUT AMPLIFIER 108 on line 250. and produces the output logic signal on line 114 to MODE SELECTOR 112. The amplifier 110 buffers the threshold detects the EST signal from the microprocessor 10. R93 provides pulldown for open input conditions and R94 limits current during transient conditions at the input. This terminated signal is applied to the base of the differential amplifiers formed by Q74, Q75 and R95. Bias current is delivered on line 250 from Q67 current source in the BYPASS INPUT AMPLIFIER 108. Q76 provides positive feedback, setting the negative going threshold to a lower value than the positive going threshold by means of resistive divider R98, R99 (shown as R99A and R99B) and R100. Q77, connected in parallel with Q76, provides an open-collector output to the MODE SELECTOR 112.

The EST CLAMP 124 receives a control input from BYPASS AMPLIFIER 108 on line 126 and clamps the EST Input from microprocessor 10 at terminal 106. In BYPASS mode the EST CLAMP 124 pulls down the EST input to signal the 10 microprocessor that the module 12 has entered the BYPASS mode. In the EST mode the input from the BYPASS amplifier 108 will be high, saturating Q99. This insures a high impedance condition at the collector of Q101, so that the EST signal is received unaffected. In the BYPASS mode the input from the BYPASS AMPLIFIER 108 is low, allowing the current mirror formed by Q100, Q101, R126, R127, and R128 to operate, sinking up to 5 ma in Q101. Normally, this will result in the EST input being forced low, signaling the microprocessor 10 that the module 12 is in the BYPASS mode.

The ADVANCE F/F 100 (FIG. 10A) receives input logic levels from the ADVANCE, DWELL, and TIMER COMPARATORS 96, 94, and 98. The CHARGE F/F 214 receives input logic levels from ADVANCE and DWELL COMPARATORS 96 and 94. The CHARGE F/F 214 supplies a control output to CHARGE SWITCH 254 on line 256. The ADVANCE F/F 100 supplies the control input to MODE SELECTOR 112 on line 120. By logically combining the outputs of the ADVANCE and DWELL COMPARATORS 96 and 94, these flip-flops 100 and 214 generate a charging pulse for the timing capacitor C201 which starts on the fall of the ADVANCE and signal ends on the rise of the $\overline{\text{DWELL}}$ input (i.e., the inverted-phase DWELL signal) on line 216, as well as a BYPASS mode current control signal which starts on the fall of the $\overline{\text{DWELL}}$ on 216 and stops at the rise of the ADVANCE signal if the of Timer Comprator 98 output is high (negative going theshold not exceeded). The two flip-flop circuits 100 and 214 are identical with the exception of the addition of Q59 in the ADVANCE F/F 100, which implements the logical "AND" function at the reset input of the signals from TIMER COMPARATOR 98 and ADVANCEk COMPARATOR 96. Operation of the CHARGE F/F 214 is as follows: On the fall of the ADVANCE input the collector of inverter transistor Q49 rises, turning on and saturating Q50. The emitters of Q47 and Q48 are simultaneously pulled to ground by Q50; because transistors Q47 and Q48 are interconnected collector to base as a flip-flop pair, and because the base of Q47 is biased lower than the base of Q48, Q47 is left "OFF" and Q48 is turned "ON". The low output at the collector of Q48 signals the CHARGE SWITCH circuit 254 to initiate the recharge of the timer capacitor C201 to 2.6 volts. When the $\overline{\text{DWELL}}$ input rises, Q46 turns "ON", interrupting the base current to Q48 which resets the flip-flop 214 and terminates the charging of the timer capacitor C201. Operating of the ADVANCE F/F 100 is similar: The fall of the $\overline{\text{DWELL}}$ input results in the rise of the collector of inverter transistor Q63 which turns "ON" Q64. The collector of Q64 simultaneously pulls down the emitters of Q61 and Q62. The base/collector connection of Q61 and Q62 forms a flip-flop which, due to the lower base bias voltage of Q61, results in Q62 coming up in the "ON" condition. The low collector voltage of Q62 is sent as an output to the MODE SELECTOR circuit 112, which in the BYPASS mode, signals a coil-current "ON" condition. When the ADVANCE input rises it turns on, transistor Q60. The collector of Q60 is connected to the emitter of Q59, thus forming an "AND" gate. If Q59 and Q60 are "ON" the collector of Q59 will be pulled down, resetting the flip-flop 100. Q59 will be ON if the input for the TIMER comparator 98 is high. This condition occurs above 900 RPM, which is the selected point for cut-in of the advance function. If the TIMER input is not high at the rise of the ADVANCE signal, the flip-flop 100 remains set (Q62 "ON") until the $\overline{\text{DWELL}}$ signal rises, turning on Q63, which turns OFF Q64, causing the output to the MODE SELECTOR 112 to rise, signaling turnoff of coil current.

The CHARGE SWITCH 254 receives the input logic signal from the CHARGE F/F 214 on line 256 and produces charging current to 900 RPM DETECTOR RC network R209 and C201 (on substrate). CHARGE SWITCH 254 charges and clamps the external RC network precisely to 2.6 volts. When the CHARGE signal from the CHARGE F/F 214 goes low, Q51 turns off. Its collector rises, turning on Q53 and Q54. This charges the external RC network via terminal 258. Charging continues through Q53 until the base clamp level set by R58 (shown as R58A and R58B), R59 and Q52 is reached. This point is set such that charging through Q53 stops just short of 2.6 volts. Charging continues through Q54 in the inverted mode until Q54 is saturated, clamping terminal 258 precisely to 2.6 volts. When the CHARGE input rises, Q51 turns on, reverse biasing Q53 and Q54, terminate the charging action.

Charging takes place during the brief interval between the fall of the ADVANCE signal and the DWELL signal due to the higher negative-going ADVANCE threshold 67 with respect to the negative-going DWELL threshold 77 interacting with the finite negative slope of the P-N waveform 64. At 900 RPM (the RPM of greatest interest) this time interval amounts to approximately 100 microseconds. Charge rate initially is set by R64 and C201. Assuming equal VBE between Q53 and Q52, charging through this path will stop at $t = 17.9 \times 10^{-6}$ sec. Thus the capacitor reaches 92% of final value in 17.9 microseconds, leaving 83 microseconds to reach 98% of final value during this interval.

The TIMER COMPARATOR 98 receives the voltage level on the 900 RPM DETECTOR RC network R209 and C201 and produces an output logic level to ADVANCE F/F 100 on line 260. TIMER COMPARATOR 98 senses the discharge level of the 900 RPM DETECTOR RC network with respect to a 1 time constant level and sends the resulting logic level to the ADVANCE F/F 100. TIMER COMPARATOR 98 operates as a simple differential amplifier Q55 and Q56 with mirror load Q57 and Q58.

The MODE SELECTOR 112 receives True and False (in-phase and out-of-phase) inputs from the BYPASS input amplifier 108 on lines 126 and 246 respectively, the BYPASS mode current control input from the ADVANCE F/F 100 on line 120, and the EST mode current control input from the EST INPUT AMPLIFIER 110 on line 114. MODE SELECTOR produces the current control output to the OUTPUT STAGE 118 on line 116. Q65 and Q78 are driven by opposite phases of the BYPASS signal; i.e., only one of transistors Q65 and Q78 is off for a given state of BYPASS. Their respective collectors are connected to the bases of Q66 and Q79, whose collectors are common, forming a "NOR" gate. The collectors of transistors Q66 and Q79 drive the base of inverting transistor Q80, which drives the OUTPUT STAGE 118.

The OCLIT AMPLIFIER 102 receives an attenuated voltage from current sense resistor R215 and produces the current limit control signal to OUTPUT STAGE 118. OCLIT AMPLIFIER 102 senses current in external power device Q201, limits this current to a preset maximum value and signals this current limit condition to DWELL CONTROL circuit 210 on line 224. The current limit loop is biased from the current source Q91. When the OCLIT input signal is low, Q95 is in saturation. R118 limits the base drive to Q95 and minimizes the loading of Q95 on the current source Q91. When the input signal is sufficiently high to cause Q96 and Q98 to be off, the external power Darlington Q201 receives its base drive through 110 ohm thick film resistor R211. The current through the primary of the ignition coil builds up at a rate determined by the battery voltage and the L/R ratio of the ignition coil. As the current through the coil reaches the level set by the ratio of R213 and R214, Q95 begins to turn off and thus causes the collector current of Q91 to be diverted to the base of Q97. Q98 then operates in its linear region and shunts some of the base drive that was available to the power Darlington. The current limit loop thus maintains a fixed current through the primary 30 of the ignition coil 32 for the remaining portion of the dwell time. R118, in conjunction with C3, a junction capacitor, form an internal roll-off network which enhances the stability of the current limit loop. Q92 turns "on" along with Q97 during current limit to signal this condition to the DWELL CONTROL circuit 210. The regulated 2.6 volt supply is used to set up a constant current through Q93, R115 and (shown as R116A and R116B).

The OUTPUT STAGE 118 receives the Dwell signal from MODE SELECTOR 112 on line 116 and the current limit signal from OCLIT AMPLIFIER 102 on line 262 and produces outputs to a high current, saturated switching transistor Q98 with un-committed collector at terminal 264 and emitter at terminal 84. OUTPUT STAGE 118 controls base current in the external Darlington power device Q201 in response to the selected input signal from MODE SELECTOR 112 and restricts output current in the external power device Q201 under control of the input from OCLIT amplifier 102. In normal connection, terminal 84 is returned via a separate trace to the module ground point and terminal 264 pulled up to V+ by thick film resistor R211. Operation is then as a straight forward Darlington connected, grounded emitter amplifier. The signal from the MODE SELECTOR 112 is a logic level applied to the base of Q96: a high logic level signals current "on" in the LIC output device Q98, resulting in an "off" condition in the external power device Q201; a low logic level at this input results in an "off" condition at LIC output transistor Q98 and an "on" condition in the external power device Q201. When the resulting current flow in the external power device Q201 reaches a level adequate to bring the OCLIT AMPLIFIER 102 into operation, a signal appears at the second input of the output amplifier, the base of Q97, signaling it to turn "on" a sufficient amount to hold the drive current to the external device Q201 at a constant level. This, in effect, is the current limit condition of the external coil current. R121 in the collectors of Q96 and Q97 limits the available base drive to Q98 while R123 serves to insure an "off" condition in Q98 in the absence of a high input signal at Q96 or Q97. R124 and Zener string Z2, Z3, Z4 and Z5 provide additional base drive to Q98 under +80 volt "load-dump" transients on V+ supply 40. D2 provides a low resistance path to clamp negative voltage excursions on the DWELL OUTPUT terminal 264.

It should now be apparent to those skilled in the art that an electronic advance and ignition control system incorporating the electronic advance capable of achieving the stated objects of the invention has been provided. The electronic advance replaces the centrifugal advance and vacuum advance and retard systems in an ignition control system. The resulting ignition control system produces output drive signals within specification limits required for proper operation of an internal combustion engine from cranking to maximum RPMs. The electronic advance may form part of a stand alone ignition control integrated circuit, or the integrated circuit may include an interface to a microprocessor which shares control of the ignition system with the integrated circuit. Through use of the combination of a fixed advanced threshold voltage which is compared with an amplitude sensitive input waveform from the distributor and a timing circuit to control cutting in of the advance over a predetermined RPM rate, the system has substantially reduced sensitivity to variations in output characteristics of the distributor sensing means.

While the invention has been shown and described with respect to a preferred embodiment thereof, it will further be apparent to those skilled in the art that various changes in form and details of the invention may be made. It is intended that such changes be included within the spirit and scope of the claims appended hereto.

What is claimed is:

1. An ignition control system connectable between a sensor responsive to rotation of a rotating element for repetitively supplying an analog timing signal and an ignition coil in which a current pulse repetitively flows, the timing signal consisting of an increasing portion during which its amplitude rises as a function of time from a minimum value substantially continuously to an intermediate value and then from the intermediate value substantially continuously to a maximum value and a subsequent decreasing portion during which its amplitude drops as a function of time immediately from the maximum value substantially continuously to a minimum value, the system having dwell means responsive to the timing signal for generating an initiation signal at a first selected time when a first specified relationship to the timing signal is attained during the increasing portion and for generating a termination signal at a second selected time when a second specified relationship to the timing signal is attained during the decreasing portion and drive means for initiating the pulse in response to the initiation signal and for terminating the pulse in response to the termination signal, characterized by: comparing means for generating an advance signal between the selected times when the timing signal reaches a predetermined threshold amplitude during the increasing portion and for supplying the advance signal to the drive means to cause it to terminate the pulse at a selected advance period of time before the second selected time.

2. An ignition control system as in claim 1 characterized in that the pulse is substantially terminated at the time when the advance signal is generated.

3. An ignition control system as in claim 2 characterized in that the absolute value of the amplitude of the timing signal increases as the rate of rotation of the rotating element increases to cause the selected advance period to increase therewith.

4. An ignition control system as in claim 3 characterized in that the first specified relationship is attained when the timing signal reaches a specified dwell threshold amplitude.

5. An ignition control system as in claim 4 characterized in that the specified dwell threshold amplitude varies between a given maximum value when the rate of rotation of the rotating element is at a first predetermined rate of rotation and a given minimum value when the rate of rotation of the rotating element is at a second predetermined rate of rotation greater than the first predetermined rate of rotation.

6. An ignition control system as in claim 1, 2, 3, 4 or 5 further characterized by means for inhibiting the comparing means when the rate of rotation of the rotating element is below a first specified rate of rotation.

7. An ignition control system as in claim 6 characterized in that the means for inhibiting comprises:
    a resistance-capacitance network which starts discharging from a first selected voltage at a specified period of time before the second selected time; and
    timing means for sensing the voltage of the network when the advance signal is generated and for supplying a signal to inhibit the comparing means whenever this voltage is below a second selected voltage.

8. An ignition control system as in claim 7 characterized in that the means for inhibiting further includes means for charging the network to the first selected voltage and for clamping the network at the first selected voltage.

9. An ignition control system as in claim 8 characterized in that the specified period of time substantially equals the period of repetition of the timing signal.

10. An ignition control system as in claim 9 characterized in that the first predetermined rate of rotation substantially equals the first specified rate of rotation.

11. An ignition control system as in claim 1, 2, 3, 4, or 5 further characterized by:
    a microprocessor responsive to the timing signal for supplying signals to the drive means to control the pulse; and
    selecting means for selectively disabling either the microprocessor from controlling the pulse or the dwell means and the comparing means from controlling the pulse.

12. An ignition control system as in claim 11 characterized in that the selecting means disables the microprocessor from controlling the pulse whenever the microprocessor has failed.

13. An ignition control system as in claim 12 characterized in that the selecting means disables the microprocessor from controlling the pulse when the rate of rotation of the rotating element is below a second specified rate of rotation.

* * * * *